United States Patent
Lichman et al.

(10) Patent No.: US 7,243,029 B2
(45) Date of Patent: Jul. 10, 2007

(54) SYSTEMS AND METHODS OF HYDROCARBON DETECTION USING WAVELET ENERGY ABSORPTION ANALYSIS

(75) Inventors: Eugene Lichman, Houston, TX (US); Scott W. Peters, Houston, TX (US); Robert W. Wiley, Sugar Land, TX (US)

(73) Assignee: Apex Spectral Technology, Inc., Houston, TX (US)

( * ) Notice: Subject to any disclaimer, the term of this patent is extended or adjusted under 35 U.S.C. 154(b) by 0 days.

(21) Appl. No.: 10/910,856

(22) Filed: Aug. 4, 2004

(65) Prior Publication Data

US 2005/0043892 A1 Feb. 24, 2005

Related U.S. Application Data

(63) Continuation-in-part of application No. 10/643,845, filed on Aug. 19, 2003, now abandoned.

(51) Int. Cl.
*G01N 15/08* (2006.01)
(52) U.S. Cl. .............................. 702/13; 702/11; 702/12
(58) Field of Classification Search ................... 702/13
See application file for complete search history.

(56) References Cited

U.S. PATENT DOCUMENTS

| | | | | |
|---|---|---|---|---|
| 4,316,267 A * | 2/1982 | Ostrander | .................... | 367/68 |
| 4,316,268 A * | 2/1982 | Ostrander | .................... | 367/68 |
| 4,694,438 A * | 9/1987 | Sengupta | .................... | 367/70 |
| 4,884,247 A * | 11/1989 | Hadidi et al. | ................. | 367/43 |
| 5,173,880 A * | 12/1992 | Duren et al. | ................... | 367/73 |
| 5,351,544 A * | 10/1994 | Endo et al. | .................... | 73/588 |
| 5,414,674 A * | 5/1995 | Lichman | ....................... | 367/49 |
| 5,583,825 A * | 12/1996 | Carrazzone et al. | .......... | 367/31 |
| 5,671,136 A * | 9/1997 | Willhoit, Jr. | ................. | 702/18 |
| 5,740,036 A * | 4/1998 | Ahuja et al. | .................. | 702/17 |
| 5,870,691 A * | 2/1999 | Partyka et al. | ................ | 702/16 |
| 5,966,672 A * | 10/1999 | Knupp | ........................ | 702/16 |

OTHER PUBLICATIONS

*MetaLink*, by Apex Metalink, Inc., Houston, Texas, Jun. 14, 2002.
Lichman, E., et al, "Direct Gas Detection Using Wavelet Energy Absorption in the East China Sea, etc.," Apex Metalink, Inc., Houston, Texas.

(Continued)

*Primary Examiner*—John Barlow
*Assistant Examiner*—Stephen J. Cherry
(74) *Attorney, Agent, or Firm*—Osha Liang LLP

(57) ABSTRACT

Disclosed herein are systems and methods of hydrocarbon detection based on wavelet energy absorption analysis. One disclosed hydrocarbon detection method embodiment includes: a) obtaining seismic trace data for a region of interest; and b) processing the seismic trace data to determine at least one wavelet energy absorption factor as a function of position within the region of interest. Another disclosed hydrocarbon detection method embodiment includes: a) receiving from a user an indication of a region of interest in a seismic data set; and b) generating a display of wavelet energy absorption anomalies within the region of interest. One of the disclosed system embodiments includes a memory and a processor. In this system embodiment, the memory stores hydrocarbon detection software that, when executed by the processor, configures the processor to determine at least one wavelet energy absorption factor from seismic trace data.

4 Claims, 6 Drawing Sheets

OTHER PUBLICATIONS

Peters, S.W., et al, "Gas Detection on Instantaneous Seismic Wavelets Applied in East China Sea," SEG 73rd Annual Meeting, Dallas, Texas, 2003.

Lichman, E. et al, "Direct Gas Detection Using Wavelet Energy Absorption", EAGE 65th Conference & Exhibition, Stavanger, Norway, Jun. 2003.

Lichman, E., "Informational Capacity of Acoustic Measurements", 4th International Conference on Theoretical and Computational Acoustics, Trieste, Italy, May 1999.

Lichman, E., "Phase Inversion Deconvolution for Surface Consistent Processing and Multiple Attenuation", Houston, Texas, SEG, 1999.

Lichman, E., "Automated Phase-based Moveout Correction", Houston, Texas.

Squyres, D.H., et al, "Direct Gas Reservoir Detection from Seismic Wavelets Using Absorption", *Oil & Gas Journal*, Jan. 5, 2004.

Squyres, D.H., et al, "Direct Hydrocarbon Detection by Wavelet Energy Absorption", *Oil & Gas Journal*, Jan. 12, 2004.

Squyres, D.H., et al, "Here are Velocity Aspects of Wavelet Energy Absorption", *Oil & Gas Journal*, Jan. 19, 2004.

Squyres, D.H., et al, "Four Examples Show Functions of Wavelet Energy Absorption", *Oil & Gas Journal*, Jan. 26, 2004.

Matheney, M.P., et al, "Seismic Attenuation Computed from GLIMPCE Reflection Data and Comparison with Refraction Results," *Pure and Applied Geophysics*, Abs. vol. 153:2-4, pp. 539-561, 1998.

Mitchell, J.T., et al, "Energy Absorption Analysis: A Case Study," SEG 66th Annual Meeting, Expanded Abstracts, pp. 1785-1788, 1996.

Roth, E.G., et al, "An Empirical Relationship Between Seismic Attenuation and Velocity Anomalies in the Upper Mantle," AGU Fall Meeting, 1998.

Derzhi, N. et al, "Structural Approach to Geophysical Data Access", www.rocksolidimages.com.

Plaintiff's Original Petition filed in the Harris County, Texas District Court, 269 Judicial District, Case No. 2006-31289, between *Eugene Lichman, Plaintiff*, vs. *Apex Solutions, Inc., Apex Metalink, Inc., Scott W. Peters, and Xia Du, Defendants* (18 pages).

* cited by examiner

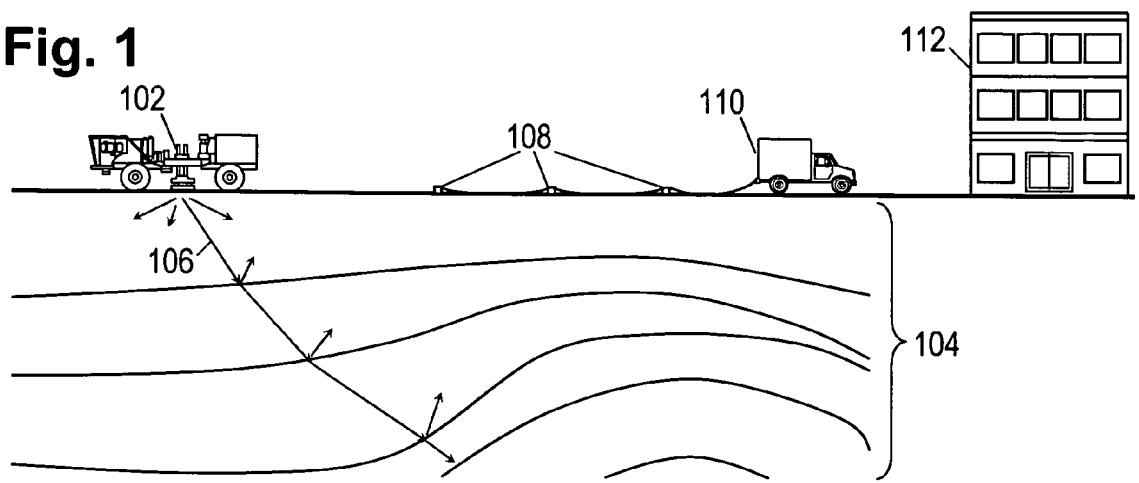
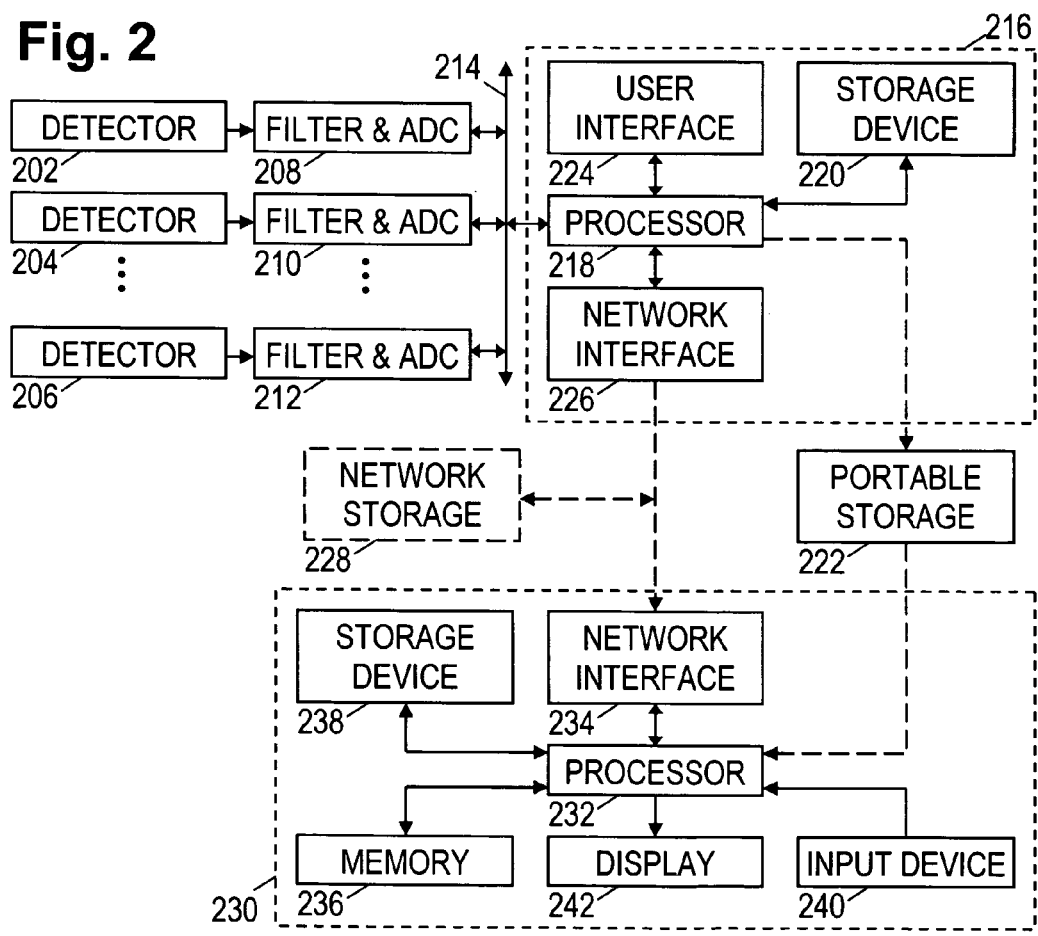

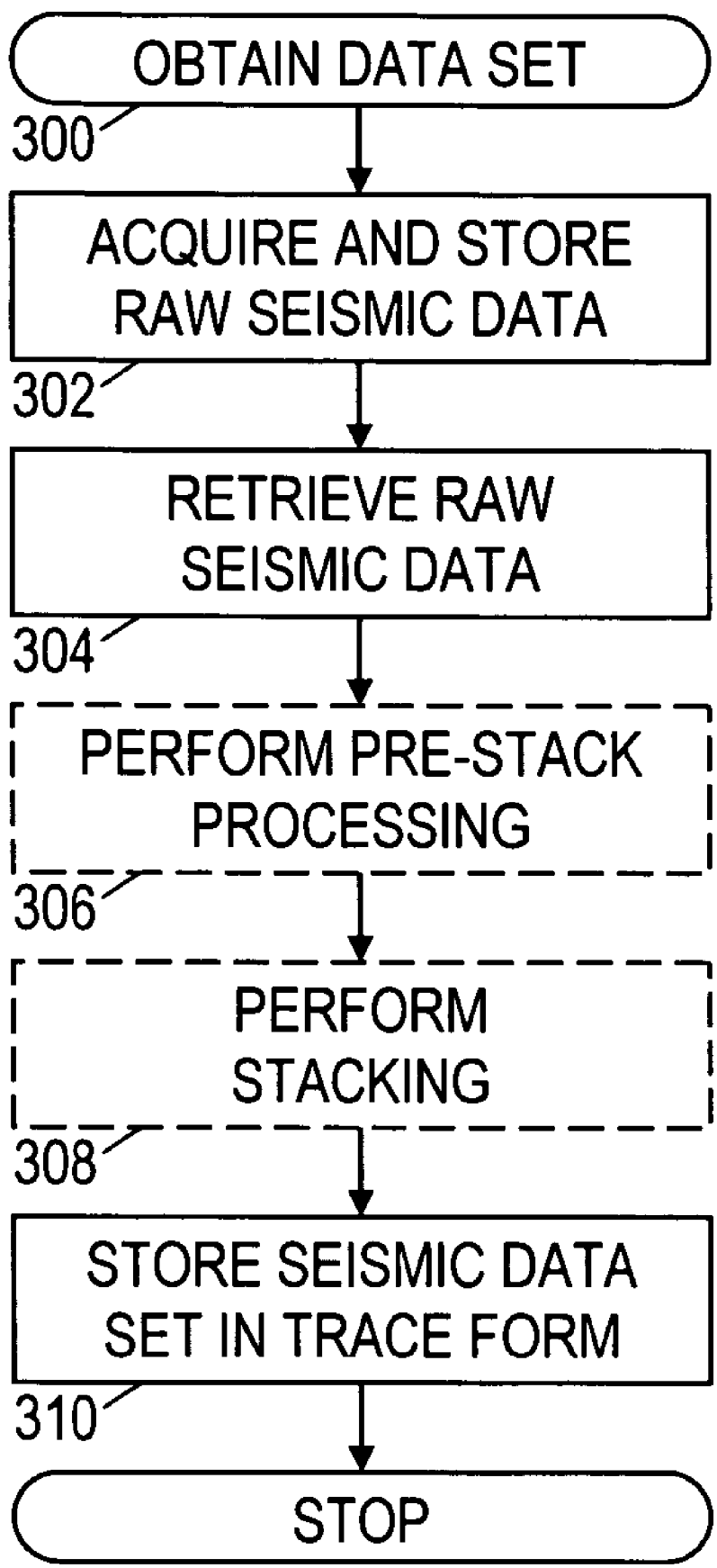

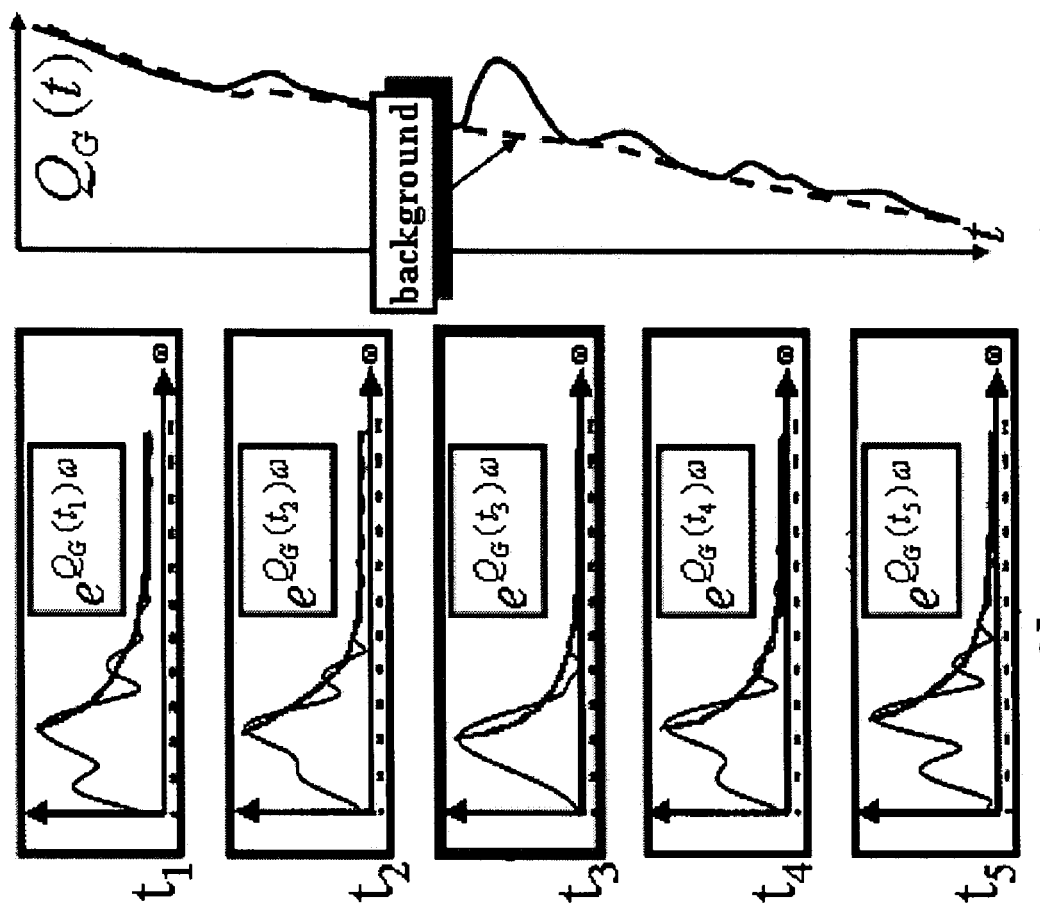
Fig. 9c
Fig. 9b
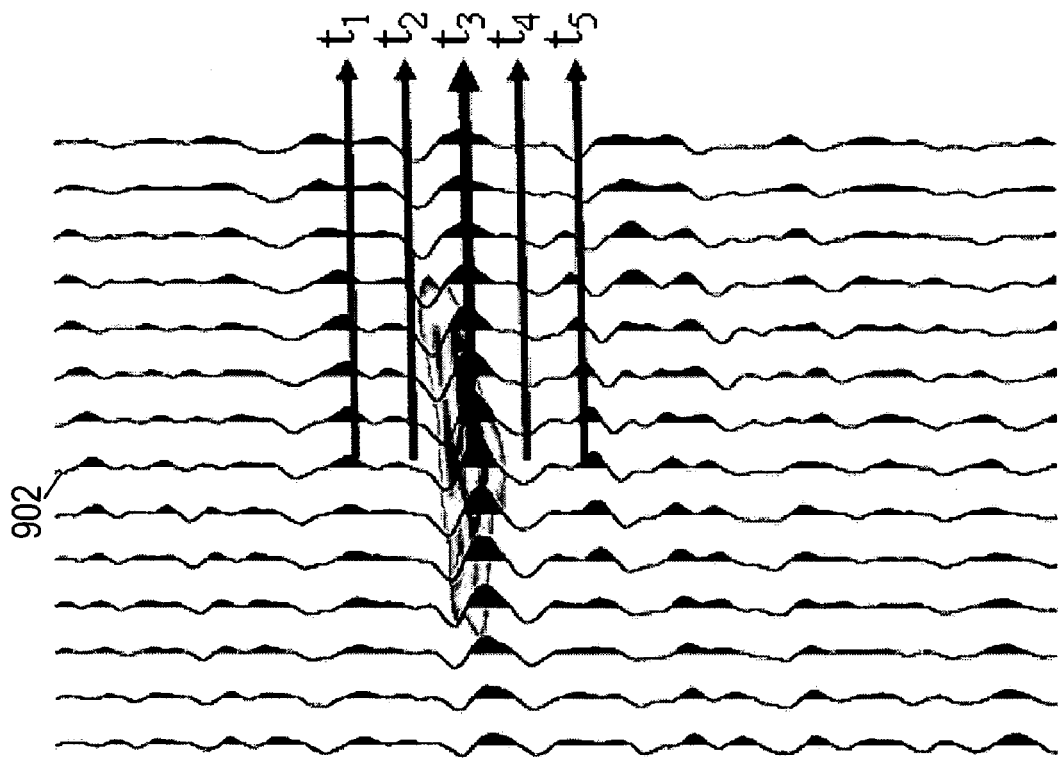
Fig. 9a

SYSTEMS AND METHODS OF HYDROCARBON DETECTION USING WAVELET ENERGY ABSORPTION ANALYSIS

CROSS-REFERENCE TO RELATED APPLICATIONS

This is a Continuation-In-Part and claims benefit, under 35 U.S.C. § 120, of application Ser. No. 10/643,845 filed Aug. 19, 2003 now abandoned. This Application is incorporated by reference in its entirety.

BACKGROUND

Existing seismic exploration methods primarily focus on the properties of the sound-reflecting boundaries present in the earth's interior. These methods are founded on theoretical conclusions and experimental observations that the strength of the sound reflection from the boundary itself is determined by certain lithological properties of rock within the layer above and the layer below this boundary.

However, reflection-boundary based methods are indirect at best. Reflections at each point on a boundary depend on no less than seven variables (P-wave velocity above, S wave velocity above, density above, P wave velocity below, S wave velocity below, density below, and angle). The interplay between these variables makes it difficult to determine any particular one with accuracy. Even under theoretically ideal measurement conditions, boundary-based theories sometimes fail. For example, the acoustic impedance contrast between sand and shale disappears in a wide age/compaction range, thus preventing or nearly preventing any boundary reflection at all.

When employing reflection-boundary based methods, it often becomes necessary to rely on additional "outside" information to interpret the seismic data. The additional data may come in the form of hypothesized models of the subsurface structure and data ("logs") from existing wells. (Typically, data from well logs is extrapolated away from the well bore along reflecting boundaries.) However, combining such forms of outside data with seismic data requires the use of additional assumptions that may or may not be valid. In the case of extrapolated well log data, there is no way to tell when the quality of the extrapolation has degraded to the point where more harm than good is being done.

Efforts to refine reflection-boundary based methods continue. Various existing or proposed methods employ neural networks (with "supervised" or "unsupervised" training) that combine large numbers of attributes to construct a reservoir model. Still other methods are inversion-based, combining well data, geophysical data, geologic data, reservoir engineering data, and geo-statistical data to construct a reservoir model. These methods have proven to be extremely complex (and expensive), involving many professionals from different disciplines in a chain that can be limited by its weakest link.

Accordingly, it would be desirable to have a reliable method of hydrocarbon detection that does not rely on reflection-boundary analysis, outside information, or unduly complex models. U.S. Pat. No. 5,414,674 issued to Lichman ("the Lichman patent") discloses a method based on resonant energy analysis of seismic data. This patent is incorporated by reference in its entirety.

The method disclosed in the Lichman patent analyzes the resonant responses generated when a seismic wave passes through a given stratum. The seismic responses are mapped onto the quefrency domain in order to separate the resonant and non-resonant components of the reflected energy. Strata that consist of predominantly elastic materials (solids and liquids) resonate in discrete frequency bands, which are represented by a quefrency spectrum with a large amplitude at high-quefrency values. Gas-bearing strata have more plastic properties and emit a more uniform response that lacks distinct resonant peaks. The Quefrency spectrum of gas-bearing strata contains a relatively higher amplitude at low-quefrency values. Therefore, strata having high concentration of natural gas hydrocarbons are located by detecting seismic data having quefrency distributions weighted toward the lower quefrencies.

The Lichman patent shows that methods not based on reflection-boundary analysis can be useful in locating gas reservoirs. There still exists a need for better methods that can be used to locate hydrocarbon (both liquid and gas) reservoirs.

SUMMARY

Disclosed herein are systems and methods of hydrocarbon detection based on wavelet energy absorption analysis. One disclosed hydrocarbon detection method embodiment comprises: a) obtaining seismic trace data for a region of interest; and b) processing the seismic trace data to determine at least one wavelet energy absorption factor as a function of position within the region of interest. Another disclosed hydrocarbon detection method embodiment comprises: a) receiving from a user an indication of a region of interest in a seismic data set; and b) generating a display of wavelet energy absorption anomalies within the region of interest. One of the disclosed system embodiments comprises a memory and a processor. In this system embodiment, the memory stores hydrocarbon detection software that, when executed by the processor, configures the processor to determine at least one wavelet energy absorption factor from seismic trace data.

BRIEF DESCRIPTION OF THE DRAWING

For a detailed description of various embodiments of invention, reference will now be made to the accompanying drawings, in which:

FIG. 1 shows an illustrative context in which hydrocarbon detection systems and methods may be employed;

FIG. 2 shows a block diagram of various illustrative hydrocarbon detection systems;

FIG. 3 shows a flowchart of an illustrative seismic data acquisition method;

FIGS. 9A, 9B, and 9C illustrate various stages of the method of FIG. 4;

DETAILED DESCRIPTION

Figure 4:
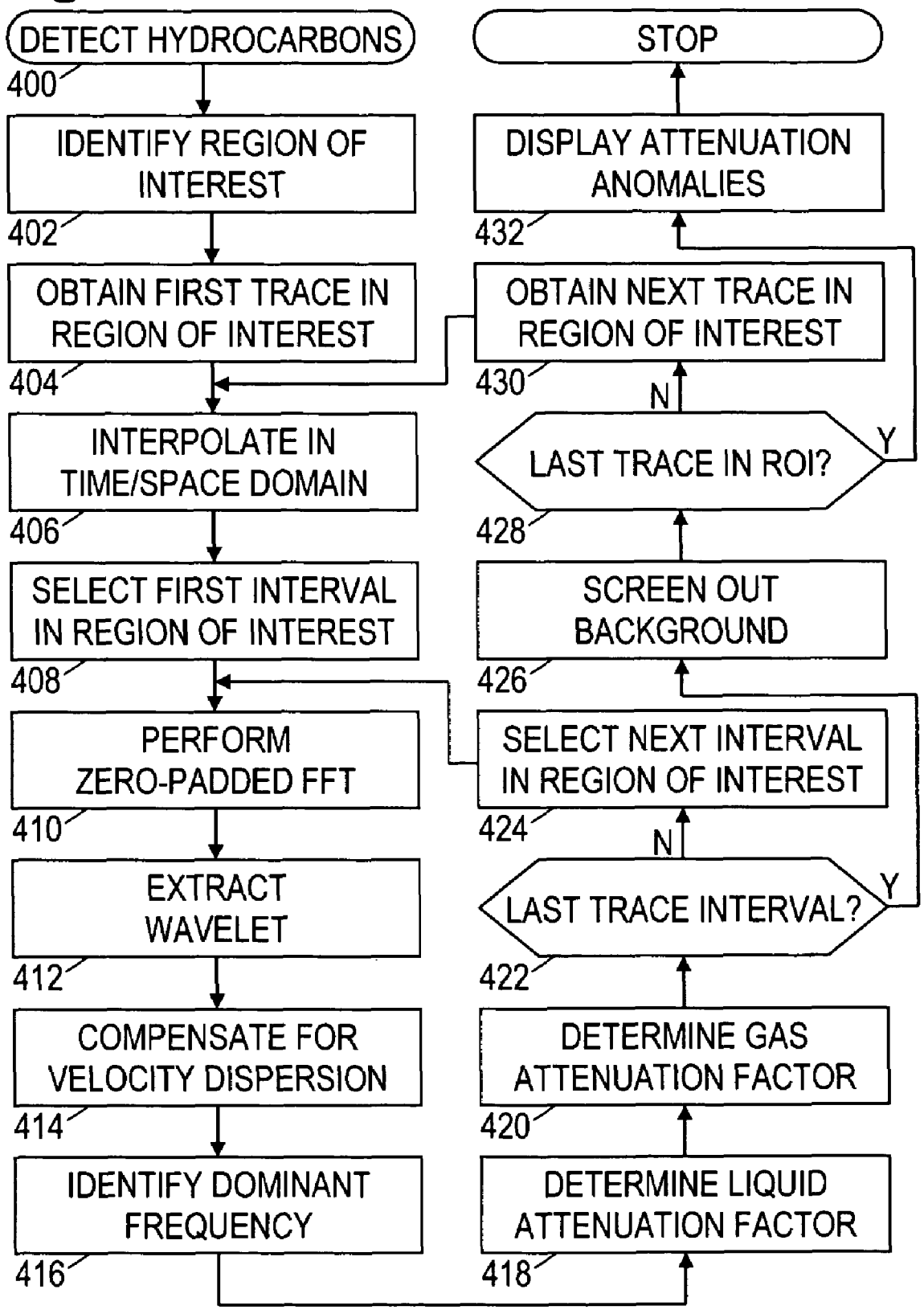
FIG. 4 shows a flowchart of an illustrative hydrocarbon detection method.

The following discussion is directed to various illustrative embodiments of the invention. Although one or more of these embodiments may be preferred, the embodiments disclosed should not be interpreted as limiting the scope of the disclosure or the claims. To the contrary, one skilled in the art will understand that the following description has broad application, and the discussion of any embodiment is meant only to be illustrative of that embodiment. The scope of the invention is delimited only by the attached claims.

Various hydrocarbon detection systems and methods are disclosed below. These systems and methods are not based on reflection-boundary analysis, but instead are based on changes to the seismic waves as they propagate through subsurface formations. When the seismic waves propagate through subsurface formations, their energies are attenuated to various extents depending on lithological properties of the formation along the paths of propagation. For an excellent overview of possible attenuation mechanisms and the current state of experimental measurements of absorption see Pride et al., "Permeability Dependence of Seismic Amplitudes," The Leading Edge, v. 22, no. 6, pp. 518-25 (2003). These changes (or energy attenuations) may be extracted and parameterized to fit a physically based model. When displayed in appropriate form, the parameters are indicative of both liquid and gas hydrocarbon reservoirs.

While seismic energy attenuation and its application in seismic analysis is well known in the art, most prior art methods focus on forward modeling, which predicts the seismic responses and, particularly, the energy absorption responses based on the given lithological properties of the rock (fractures, porosity, permeability, liquid saturation, etc). In forward modeling, the properties of the rock are iteratively adjusted and the predicted seismic responses are calculated until the calculated responses fit the experimental responses.

Embodiments of the invention are based on findings by the inventor that the energy attenuation depends on both the frequencies of the seismic waves and the types of fluids in the formation in a specific manner. Within the commonly-used seismic frequency range and in a partially liquid-saturated rock, energy attenuation is proportional to the liquid saturation in the rock, and this attenuation increases with decreasing frequency. On the other hand, in a partially gas-saturated rock, the energy attenuation is directly proportional to gas-saturation and this attenuation increases with frequency. For a detailed discussion of the mechanisms accounting for these phenomena and application examples, see Lichman et al., "Direct Gas Reservoir Detection from Seismic Wavelets Using Absorption," The Oil and Gas Journal, pp. 32-37, Jan. 5, 2004; "Wavelet Energy Absorption—1: Direct Hydrocarbon Detection by Wavelet Energy Absorption," The Oil and Gas Journal, pp. 34-39, Jan. 12, 2004; "Wavelet Energy Absorption—2: Here Are Velocity Aspects of Wavelet Energy Absorption," The Oil and Gas Journal, pp. 36-44, Jan. 19, 2004; "Wavelet Energy Absorption—3: Four Examples Show Functions of Wavelet Energy Absorption," The Oil and Gas Journal, pp. 48-52, Jan. 25, 2004. These papers are incorporated by reference in their entireties. Thus, embodiments of the invention are based on models with two independent mechanisms of frequency-dependent attenuation in partially saturated rocks.

FIG. 1 shows an illustrative context for use of the disclosed systems and methods. A seismic source 102 such as a vibrator truck, a small explosion, or an air gun (in underwater surveys), generates seismic waves that propagate through subsurface formations 104. As shown by a selected propagation path 106, the seismic waves reflect and refract at boundaries between subsurface formations 104, and eventually some of the reflected seismic waves reach an array of receivers 108. The array typically includes hundreds of receivers 108 spaced in a grid pattern. Receivers 108 convert seismic waves into electrical signals that are then recorded at a recording facility 110 such as a recorder truck. Eventually the recorded data is transported or transmitted to a central facility 112 for analysis.

Seismic source 102 typically fires multiple times at different locations relative to the array of receivers 108. The array of receivers 108 may then be moved and the process may be repeated many times. The use of multiple source and receiver locations allows data from different propagation paths to be combined in a manner that attenuates noise.

FIG. 2 shows a block diagram of various systems and devices employed in gathering and analyzing seismic data. Detectors 202, 204, and 208, are transducers that convert seismic waves into electrical signals that are then amplified. Analog-to-digital converter (ADC) blocks 208, 210, and 212, receive the amplified electrical signals from detectors 202, 204, and 208, respectively. ADC blocks 208, 210, and 212, filter the amplified electrical signals and convert them to digital form. Digital sampling is performed at an interval of, for example, 1-4 milliseconds. Each receiver 108 may include at least one detector and ADC block.

A bus 214 couples ADC blocks 208, 210, and 212 to a recording system 216. Bus 214 is a simplified representation of multiple cables and/or wireless connections with corresponding adapters.

Illustrative recording system 216 includes a processor 218, a storage device 220, a user interface 224, and a network interface 226. Recording system 216 may also couple to a portage storage device 222. Processor 218 collects and formats the digital data from the receivers and stores the digital data in files on storage device 220 or portable storage device 222. The files typically include header information regarding the data in the file, e.g., the number of array receivers, the bit resolution of the digitized samples, the sampling rate, the starting time and length of the recording period, and the positions of the source and each receiver in the array. The seismic data samples are typically multiplexed and written into the file as they are received. A new file may be created for each firing of the seismic source 102.

The manner of collecting and recording the data may be controlled via a user interface 224. Typically, user interface 224 includes a display upon which processor 218 shows options that can be configured by the user, and a keypad or other input device that the user can use to communication the desired configuration to the processor 218.

Once surveying is completed, the seismic data files may be transported or transmitted to a hydrocarbon detection system 230 via portable storage device 222 or network interface 226. Files transmitted via network interface 226 may be transmitted directly to system 230, or alternatively may be stored at an intermediate network storage device 228 and there made available for retrieval by system 230.

Hydrocarbon detection system 230 may be a general-purpose computer configured for operation as a hydrocarbon detection system through the use of software. System 230 includes a processor 232, a network interface 234, a memory device 236, a storage device 238, an input device 240, and a display device 240. Network interface 234 may couple processor 232 to recording system 216 and/or to network storage device 228, allowing processor 232 to retrieve software and data stored on recording system 216 and/or network storage device 228. Software (stored on memory device 236, storage device 238, or network storage device 228) configures processor 232 to interact with a user via input device 240 and display 242.

The user may cause processor 232 to perform a seismic data file processing program stored on storage device 238 or on network storage device 228. Processor 232 typically begins program execution by causing some or all of the program to be copied into memory 236 for fast access. With guidance from the user, the data file processing program retrieves seismic data files from portable storage device 222 or from network storage device 228 if they are not already present on local storage device 238. The data file processing program then performs pre-stack processing on the data, stacks the data, and stores the stacked data as a new seismic data set.

The user may then cause processor 232 to execute a hydrocarbon detection program. As with the data file processing program, processor 232 begins execution by coping the hydrocarbon detection program into memory 236. With guidance from the user, the hydrocarbon detection program configures processor 232 to retrieve traces from the raw seismic data files or from the stacked seismic data set. The hydrocarbon detection program configures processor 232 to process the traces as described in greater detail below, eventually producing a hydrocarbon map or volume for viewing by the user.

The following discussion describes various illustrative methods implemented by system 230. The corresponding figures show the methods in the form of flowcharts having blocks to represent component operations, and arrows to represent potential operation sequences. System 230 may carry out the component operations of the various methods in the sequences shown, or alternatively, many of the operations may be re-ordered, or even performed concurrently, without impairing the usefulness of the methods. The methods are ultimately carried out by hardware, but the methods' control logic may be implemented in the software, firmware, or hardware of system 230.

FIG. 3 shows a flowchart of an illustrative method 300 to obtain a seismic data set, including optional operations performed by a seismic data file processing program. In block 302, a recording system 216 acquires and records raw seismic data as described previously. In block 304, a hydrocarbon detection system 230 retrieves (with guidance from a user) the raw seismic data and reorders the digitized samples. As noted previously, recording system 216 stores the data as it is acquired, i.e., in time order. System 230 converts the data file format to a trace-based format, i.e., the digitized samples are reordered to provide a separate time sequence for each receiver. System 230 may further associate with each trace a map location that is halfway between the receiver and the seismic source.

Method 300 includes two optional blocks 306 and 308, which can be omitted independently of each other. In block 306, system 230 performs pre-stack processing, i.e., processing of individual traces to increase the signal to noise ratio with minimum distortion of the signal. This may take various forms such as low pass filtering, matched filtering, or phase inversion deconvolution. Phase inversion deconvolution is described in E. Lichman, "Phase Inversion Deconvolution for Surface Consistent Processing and Multiple Attenuation", SEG 69$^{th}$ Annual Meeting Expanded Abstracts, pp 1299-1302. In brief, phase inversion deconvolution involves taking a Fourier Transform of the trace to obtain a trace spectrum, determining a cepstrum of the trace spectrum, separating wavelet information in the cepstrum from the reflectivity and noise information, calculating a wavelet spectrum from the cepstrum wavelet information, and performing an inverse Fourier Transform to obtain the deconvoluted trace.

In block 308, system 230 identifies for each map location those traces having the map location as a midpoint between the receiver and the seismic source. These traces may be sorted based on offset, i.e., the distance between the map location and the receiver. System 230 then averages ("stacks") the identified traces having a common offset. Note that in some stacking variations, system 230 may stack all the identified traces for a map location, after first stretching the traces in the time domain as a function of offset and estimated velocities. Stacking operation 308 further enhances the signal to noise ratio of the traces. In one variation, system 230 also implements the phase moveout (PMO) correction method (or the residual phase moveout (RPMO) correction method) described in E. Lichman, "Automated Phase-based Moveout Correction", presented at the SEG 69$^{th}$ Annual Meeting, 1999, Houston, Tex., USA. In brief, these correction methods involve determining a phase spectrum from the minimum-offset trace and applying this phase spectrum to traces having larger offsets. These correction methods may be applied immediately before stacking.

In block 310, system 230 stores the reformatted (and optionally filtered and stacked) seismic data set on network storage device 228 or local storage device 238. Most seismic data processing software is configured to access seismic data in this trace-based format. Accordingly, system 230 may conveniently perform multiple hydrocarbon detection techniques without repeating the foregoing operations.

FIG. 4 shows a flowchart of an illustrative hydrocarbon detection method 400. Beginning in block 402, system 230 identifies (with guidance from a user) a region of interest the seismic data volume represented by the seismic data set. The region of interest may include the entire seismic data volume, or the region of interest may be smaller, including a subset of the traces and/or a selected time or depth range in the traces. The user may indicate the region of interest using one or more text entry fields, motion of a pointer device, scroll bars, buttons, or other information entry techniques.

In block 404, system 230 begins working through the region of interest systematically, obtaining a first trace from the seismic data set. The trace may be copied into memory 236 for faster access.

In block 406, system 230 interpolates the trace in the time domain. Time interpolation is an optional operation that is designed to increase the accuracy of subsequent operations. Accordingly, the degree of interpolation is customizable, and may be chosen to be high enough to provide reliable spectra within small time windows. For example, a trace that is originally sampled at 125 Hz (1 sample every 4 milliseconds) may be interpolated by a factor of 8 to provide 32 time samples within a 16 millisecond time window. An illustrative method of time interpolation is described further below with reference to FIG. 5.

In block 408, system 230 begins processing the trace systematically, obtaining time samples from a first trace interval in the region of interest. The interval is the size of the selected time window, e.g., 16 milliseconds. This interval represents the first position of a "sliding window" that system 230 moves through the region of interest along the trace.

In block 410, system 230 performs a Fourier Transform (such as a Fast Fourier Transform, or "FFT") to determine a discrete frequency spectrum. As noted above with reference to block 406, the seismic trace may optionally be interpolated to improve the spectral resolution after FT. Additionally, the seismic trace may be zero padded before the FT in this step in order to increase the spectral resolution. The spectral resolution of the transform depends on the size of the time interval. By padding the time samples with zeros, the size of the time interval (and hence the spectral resolution) can be increased. Thus, for example, appending enough zeros to increase the time interval from 16 milliseconds (the size of the time window) to 4 seconds, the spectral resolution can be increased to 0.25 Hz per frequency transform coefficient.

In block 412, system 230 extracts a seismic wavelet from the frequency spectrum. More specifically, system 230 determines a wavelet spectrum from the frequency spectrum determined in block 410. An illustrative method of wavelet extraction is described further below with reference to FIG. 6.

Figure 8:
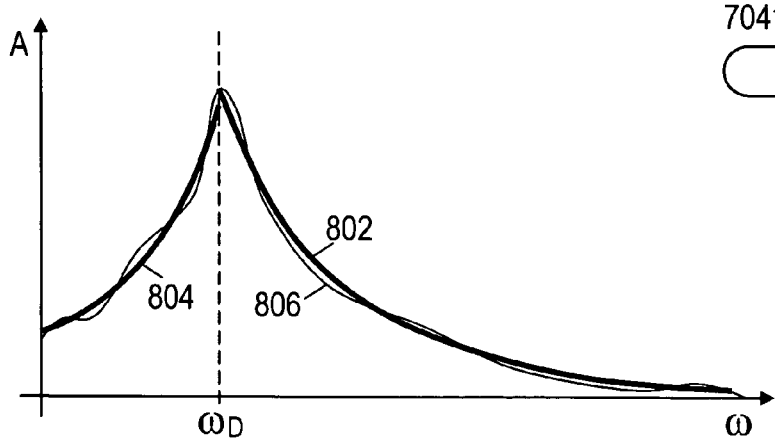
FIG. 8 shows a wavelet spectrum and an illustrative spectrum model.

An example of an extracted wavelet spectrum is shown in FIG. 8 as curve 806. Also shown in FIG. 8 is a parameterized model of the wavelet spectrum. The wavelet spectrum has a maximum amplitude at a dominant frequency $\omega_D$. The parameterized model may be based on mechanisms for the frequency-dependent absorption of seismic wave energy. Absorption caused by gas compression dominates at high frequencies, while absorption caused by liquid motion (squirt flow) dominates at low frequencies. Accordingly, the parameterized model may include a gas absorption curve 802 above the dominant frequency ($\omega_D$), and a liquid absorption curve 804 below the dominant frequency ($\omega_D$). For Example, the model may be expressed as:

$$\hat{A}(\omega) = \begin{cases} a_1 + a_2 e^{Q_L \ln^n(\omega)} & \text{for } 0 \leq \omega < \omega_D \\ a_3 e^{-Q_G \omega} & \text{for } \omega > \omega_D \end{cases} \quad (1)$$

where $\omega$ is frequency, n is a real number, $a_1$, $a_2$, and $a_3$ are constants, $Q_L$ is a liquid absorption factor, and $Q_G$ is a gas absorption factor. These wavelet energy absorption factors ($Q_L$ and $Q_G$) are independent of frequency but strongly dependent on a number of lithological properties. For present purposes, it is sufficient to note that the liquid absorption factor $Q_L$ increases with permeability and decreases as the liquid viscosity increases. If there is more than one liquid present in the pore space, then $Q_L$ will be related to the relative permeability of the liquids. The gas absorption factor $Q_G$ is proportional to the bulk volume of the gas, which is defined as the porosity times the gas saturation times the thickness of the reservoir.

Equation (1) represents a general model that accounts for energy attenuation by liquid on the low frequency side and energy attenuation by gas on the high frequency side. One of ordinary skill in the art would appreciate that other variations of this model are possible without departing from the scope of the invention. For example, in Equation (1), n is a real number, which, together with $a_1$ and $a_2$, may be used to fine tune the model to better fit energy attenuation by the liquid in the experimental data. If n=1, then a simplified model is obtained, in which the constants $a_1$ and $a_2$ can be used to fine tune the model. In this case, Equation (1) can be simplified as:

$$\hat{A}(\omega) = \begin{cases} a_1 + a_2 e^{Q_L \ln(\omega)} & \text{for } 0 \leq \omega < \omega_D \\ a_3 e^{-Q_G \omega} & \text{for } \omega > \omega_D \end{cases} \quad (2)$$

In addition, Equation (2) may be further simplified as:

$$\hat{A}(\omega) = \begin{cases} a_1 + a_2 \omega^{Q_L} & \text{for } 0 \leq \omega < \omega_D \\ a_3 e^{-Q_G \omega} & \text{for } \omega > \omega_D \end{cases} \quad (3)$$

While the above-described models, e.g., Equations (1)-(3), are based on the mechanisms underlying gas and liquid attenuation of the seismic energy, embodiments of the invention are not so limited. As it will become apparent in the following description, embodiments of the invention depend on a "relative" contrast, between a hydrocarbon reservoir and its surrounding formation. The relative contrast may be based on a parameter related to seismic energy attenuation by liquid and/or gas. Embodiments of the invention do not depend on accurate determination of the "true" gas or liquid attenuation constants (absorption factors) ($Q_G$ and $Q_L$). Therefore, other forms of equations (models) that can fit the apparently exponential decays on both sides of the peak centering at the dominant frequency ($\omega_D$) can potentially be used. However, in general, the mechanism-based models, as shown in Equations (1)-(3), will produce more reliable contrast and are preferred.

After extracting the wavelet in block 412 (FIG. 4), system 230 compensates for velocity dispersion effects on the wavelet spectrum. An illustrative method of velocity dispersion compensation is described further below with reference to FIG. 7.

In block 416, system 230 identifies the dominant frequency $\omega_D$ of the wavelet spectrum, i.e., the frequency at which the spectrum amplitude is a maximum. In block 418, system 230 determines the liquid absorption factor by fitting the liquid absorption curve 804 to the wavelet spectrum 806 at frequencies below the dominant frequency ($\omega_D$). A least-squares curve fitting technique may be employed to determine the optimal values of the constants n, $a_i$ and the liquid absorption factor $Q_L$.

In block 420, system 230 determines the gas absorption factor by fitting the gas absorption curve 802 to the wavelet spectrum 806 at frequencies above the dominant frequency ($\omega_D$). Again, a least-squares curve fitting technique may be employed to determine the optimal values of the constant $a_3$ and the gas absorption factor $Q_G$.

In block 422, system 230 determines whether the last time interval in the region of interest for the trace has been processed. If not, system 230 increments the sliding time window to its next position along the trace in block 424, and repeats the operations of blocks 410-424 until all the trace's time intervals that are in the region of interest have been processed. The sliding increment provided in block 424 is configurable. The increment may be a fraction of the time window, and alternatively may be greater than the size of the time window.

Once gas and liquid absorption factors ($Q_G$ and $Q_L$) have been determined for each time window position in the region of interest on a trace, system 230 progresses to block 426 from block 422. At this point, system 230 the gas and liquid absorption factors can be shown as curves, i.e., plotted as a function of time for the trace. These liquid and gas absorption factor curves are of interest and may be saved for later processing. However, it is the anomalies of the liquid and gas absorption factors that are of particular interest to the present illustrative method. Thus, in block 426, system 230 processes the liquid and gas absorption factors to identify anomalies.

The processing in block 426 may take various forms. In some embodiments, the liquid and gas absorption factors are processed individually, whereas in different embodiments, anomalies are determined by combining the absorption factors in some fashion. As one particular example, system 230 determines a background curve for each absorption factor by using a "best fit" straight line or slowly changing curve (e.g., a low-order polynomial curve). System 230 then determines that an anomaly exists where the gas or liquid absorption factor curve deviates from the "best fit" straight line or curve by more than a threshold amount. Different threshold amounts may be employed for the gas and liquid absorption factors.

As another particular example, a high pass filter may be applied to a liquid or gas absorption factor curve to identify relatively sudden changes in absorption factors. These changes may be taken as boundaries of an anomaly, and the original absorption factor curves may be used to determine anomaly magnitudes. In further examples, the first and/or second order derivatives of the liquid or gas absorption factor curves may be used to identify the absorption factor anomalies.

"Anomaly" as used herein refers to substantially different absorption factor in a region as compared with the neighboring regions. In some embodiments of the invention, the regions having absorption factor anomalies may be automatically determined by a method of the invention. In some embodiments, the regions having absorption factor anomalies may not be explicitly determined. Instead, the absorption factor curves may simply be displayed to allow the user to visually identify the regions of absorption factor anomalies.

In block 428, system 230 determines whether the last trace in the region of interest has been processed to measure absorption factor anomalies. If not, system 230 selects the next trace in block 430, and repeats blocks 406-430 until absorption factor anomalies have been sought in all traces in the region of interest. In some circumstances it may be unnecessary to process every trace, e.g. the desired resolution is less than the available resolution. In such circumstances, a pattern of traces may be selected, allowing some of the traces in the region of interest to be skipped. For example, only every other trace or every third trace is processed.

Once all selected traces have been processed, in block 432 system 230 displays the absorption factors or the absorption factor anomalies. The display format is configurable. Thus, the absorption factor (anomalies) may be viewed as a function of one axis (e.g., a time axis for a trace), two axes (e.g., a map view, a contour map, a color coded map, or a vertical cross-section), or more. Examples of a three-axis image dependence include: a perspective view of a data volume, an animated "fill" of a data volume, and a perspective view of intersecting vertical cross-sections. Other forms of configurability are also contemplated. For example, the display may take the form of a printed image and/or a video image. The display format may use color, gray-scale, or contour lines to depict the absorption factor values or the anomaly measurements. The absorption factors or anomaly measurements may be overlaid on views of seismic trace data. The liquid and gas absorption factors or anomalies may be displayed in separate images, or they may be combined into a single image. Finally, the display may be interactive, allowing the user to dynamically configure various display options. Other examples of display formats are discussed further below with respect to FIGS. 10 and 11.

Figure 5:
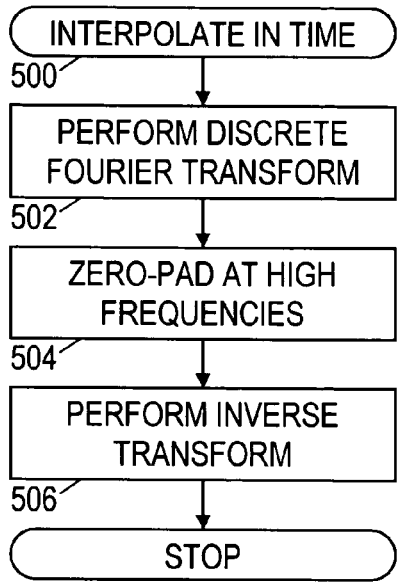
FIG. 5 shows a flowchart of an illustrative time interpolation method.

The typical scale of the gas or oil reservoirs requires a time-window size between 8 and 80 milliseconds. A window of this size does not contain enough signal samples (data points) to reliably compute the spectrum using the conventional FFT. Therefore, the seismic traces need to be interpolated. The interpolation procedure should be frequency-domain invariant. FIG. 5 shows an illustrative interpolation method 500, which is suitable for implementing the operation of block 406 in FIG. 4. Beginning in block 502, system 230 performs a Fourier Transform (e.g., a fast Fourier Transform ("FFT")) on the trace, thereby producing a discrete frequency spectrum of the trace. Interpolation is then accomplished by zero padding (i.e., increasing the number of data points) in the discrete frequency spectrum, e.g., increasing the number of data points from n to 8n to interpolate by a factor of 8. The zero padding can be by adding data points to the high frequency end beyond the original Nyquist frequency so as to extend to the Nyquist frequency to a new, desired frequency (block 504). An exemplary method of interpolation is illustrated in FIG. 5 of U.S. Pat. No. 5,414,674. In block 506, system 230 performs an inverse Fourier Transform of the padded discrete frequency spectrum. This inverse transform results in the desired, interpolated time-domain trace.

Figure 6:
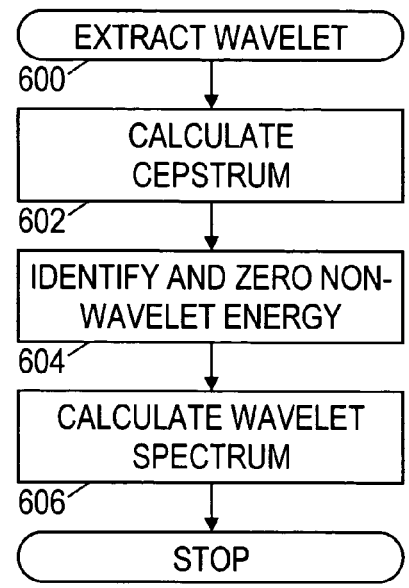
FIG. 6 shows a flowchart of an illustrative wavelet extraction method.

Interpolation of the seismic traces permits the computation of more reliable instantaneous spectrum after Fourier Transformation. This in turn allows wavelets to be reliably extracted from the instantaneous spectrum. FIG. 6 shows an illustrative wavelet extraction method 600, which is suitable for implementing the operation of block 412 in FIG. 4. Beginning in block 602, system 230 operates on the discrete frequency spectrum T(w) to calculate the real cepstrum C(t). The real cepstrum may be calculated as:

$$C(t)=FT\{\ln|T(w)|\} \tag{4}$$

In words, system 230 determines the magnitude of the discrete frequency spectrum T(w), i.e., by Fourier Transformation (e.g., short-window FT) of the interpolated seismic trace, calculates the natural logarithm (or regular logarithm) of this instantaneous spectrum, and then performs a second Fourier Transform on the values obtained from the logarithm calculation to produce the cepstrum. In this special case, an inverse Fourier Transform on the values obtained from the logarithm calculation will also produce a useable cepstrum. The real cepstrum C(t) ranges from $-t_{max}$ to $+t_{max}$, and is symmetric about the origin t=0.

Under certain measurement conditions described in Lichman, "Informational Capacity of Wavefield Measurements", J. of Computational Acoustics, Vol. 9, No. 4 (2001) 1395-1406, (which is hereby incorporated by reference) the cepstrum calculation segregates the wavelet information from the reflectivity information (and most of the noise information). These measurement conditions are nearly always satisfied. Accordingly, the wavelet information can be extracted in the cepstrum domain as the values between $t_{LOW}$ and $t_{HIGH}$. The seismic source type and other measurement conditions may affect the optimal values of $t_{LOW}$ and $t_{HIGH}$. In one embodiment, $t_{HIGH}$ is a positive number fixed at 40% of $t_{max}$, and $t_{LOW}$ is a negative number having a magnitude approximately equal to that of $T_{HIGH}$. The value of $t_{LOW}$ may be interactively adjusted based on the seismic source type (e.g., vibroseis, dynamite, air gun).

In block 604, system 230 zeroes all real cepstrum values outside the range $t_{LOW}$ to $t_{HIGH}$, thereby obtaining a wavelet cepstrum W(t). In block 606, system 230 calculates the wavelet spectrum A(ω) from the wavelet cepstrum W(t) as follows:

$$A(\omega)=\exp[FT\{W(t)\}] \quad (3)$$

In words, system 230 performs a Fourier Transform on the wavelet spectrum W(t), and exponentiates each of the transform coefficients to obtain the wavelet spectrum A(ω).

The wavelet is not only affected by energy attenuation, but also by velocity dispersion. For example, when a wavelet propagates from a region with low group velocity into a region with high group velocity, it stretches more quickly in space. This stretch of the wavelet in space is related to the wavelet stretch as a function of its two-way travel time. The consequence of the wavelet stretch in time domain is that the spectrum of the wavelet is compressed in the frequency domain. The compression in the frequency domain will result in apparently higher energy attenuation factors. Therefore, the velocity dispersion in the wavelet should be compensated for. Otherwise, the calculated gas or liquid attenuation factors will not be accurate.

Figure 7:
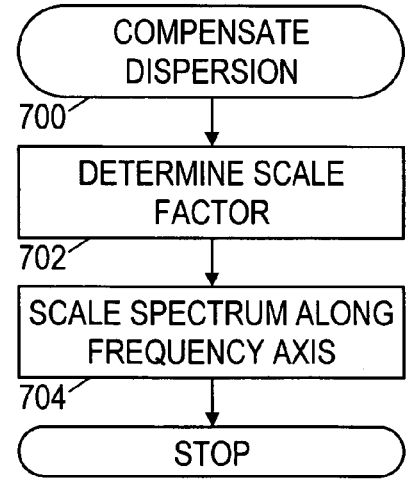
FIG. 7 shows a flowchart of an illustrative dispersion compensation method.

FIG. 7 shows an illustrative compensation method 700 for velocity dispersion. Method 700 is suitable for implementing the operation of block 414 in FIG. 4. Beginning in block 702, system 230 measures the length L of the wavelet spectrum and determines a corresponding scale factor, e.g., s=D/L, where D is a predetermined constant. A number of different length measurements may be employed. In one embodiment, the dominant frequency is used as a length measurement. In another embodiment, the length measurement is based on the first frequency (greater than the dominant frequency) at which the spectrum magnitude falls below a predetermined threshold value. In yet another embodiment, the length measurement is based on the 3 dB width of the spectrum, i.e., the distance between the points at which the spectrum equals half the maximum value.

In block 704, system 230 scales the frequency axis, e.g., $A_{comp}(\omega)=A(s\omega)$, wherein s is a scale factor chosen to standardize the "length" of the wavelet spectrum. System 230 may scale each wavelet spectrum to a predetermined length, e.g., D=1. This scaling operation adequately compensates for velocity dispersion.

FIGS. 9A-9C illustrate various stages of method 400. FIG. 9A shows a set of seismic traces (albeit in analog form) from which a particular trace, trace 902, has been selected for processing. A time window (not specifically shown) is moved along the entire length of the trace, and at each position a wavelet is extracted. Five specific positions are labeled as $t_1$, $t_2$, $t_3$, $t_4$, and $t_5$.

FIG. 9B shows a set of five extracted wavelet spectra that correspond to the five specific time window positions of FIG. 9A. Also shown are the least-squares fit gas absorption curves, i.e., the curves that were determined in block 420. The gas absorption factor $Q_G$ has accordingly been determined for these five specific positions as well as all the other time window positions along trace 902.

FIG. 9C shows the gas absorption factor $Q_G$ as a function of time window position. Also shown is a gas absorption factor background estimate. A strong anomaly is evident at a position corresponding to $t_3$ in FIG. 9A.

Figure 10:
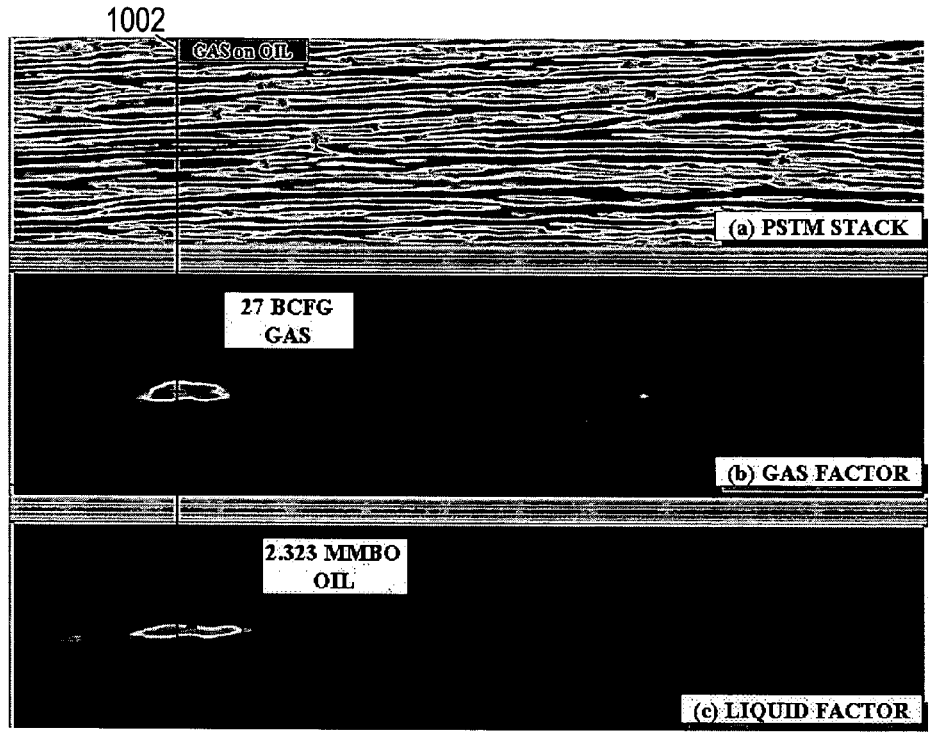
FIG. 10 shows an illustrative display of absorption factor anomalies.

FIG. 10 shows an illustrative display of absorption factor anomalies. The display of FIG. 10 includes three panels labeled (a) Pre-Stack Time Migrated (PSTM) stack, (b) Gas Factor, and (c) Liquid Factor. The vertical axis of each panel is a time axis, and the horizontal axis is a geographical position axis. Thus each panel shows a vertical cross-section of the formations. A vertical black line 1002 crosses the three panels at the location of a producing well (both gas and oil are produced).

The PSTM panel shows seismic wave amplitude data using color to indicate amplitude value. Many high amplitude bands cross the PSTM panel horizontally, making hydrocarbon detection difficult.

The gas factor panel shows the gas absorption factor anomalies calculated by system 230 from the PSTM stack data. As expected, a strong anomaly is present around the well position clearly identifying the concentration of gas. Several other ghostly anomalies are present in other regions of the panel, but it is clear that the commercially available gas hydrocarbons are already being produced.

The liquid factor panel shows the liquid absorption factor anomalies calculated by system 230 from the PSTM stack data. As expected, a strong anomaly is present around the well position clearly identifying the liquid reservoir. A few other ghostly anomalies are present in other regions of the panel, but again it is clear that the commercially available liquid hydrocarbons are already being produced.

Figure 11:
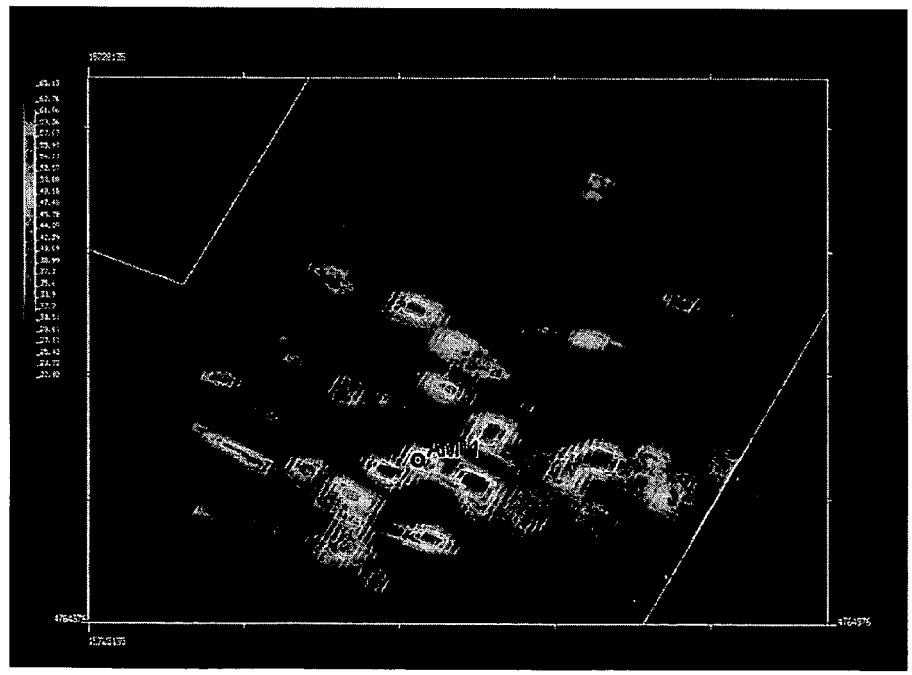
FIG. 11 shows another illustrative display of absorption factor anomalies.

FIG. 11 shows another illustrative display. In the display of FIG. 11, the maximum absorption has been extracted from a 50 millisecond envelop bounded by two interpreted time horizons and then draped on a top time horizon which is at a depth of roughly 5,500 meters. The vertical axis represents position along a north-south axis, and the horizontal axis represents position along an east-west axis. The display shows gas absorption factor anomalies as a function of position, using color to indicate anomaly magnitude. At least ten strong anomalies are present, indicating locations of commercially viable concentrations of gaseous hydrocarbons. The strong anomalies are generally surrounded and connected by lesser anomalies.

Though the foregoing methods and operations have been described with respect to seismic trace data having a time axis, they may readily be adapted to seismic trace data having a depth axis.

While specific embodiments of the invention have been disclosed and described above, the invention is not limited by the discussion, but instead is limited only by the scope of the appended claims.

What is claimed is:

1. A hydrocarbon detection system that comprises:
a memory having hydrocarbon detection software; and
a processor coupled to the memory to execute the hydrocarbon detection software, wherein the hydrocarbon detection software configures the processor to retrieve seismic trace data from a storage device, and further configures the processor to process the seismic trace data to determine at least one wavelet absorption factor, wherein the wavelet energy absorption factor relates to seismic energy attenuation as a function of frequency, wherein as part of configuring the processor to process the seismic trace data, the hydrocarbon detection software configures the processor to calculate a wavelet spectrum for each of multiple positions in a region of interest, and further configures the processor to fit a parameterized model to each wavelet spectrum, wherein the parameterized model is expressible as:

$$\hat{A}(\omega) = \begin{cases} a_1 + a_2 \omega^{Q_L} & \text{for } 0 \leq \omega < \omega_D \\ a_3 e^{-Q_G \omega} & \text{for } \omega > \omega_D \end{cases}$$

wherein $\omega$ is frequency, $\omega_D$ is a frequency where the wavelet spectrum reaches a maximum, $a_1$, $a_2$, and $a_3$ are constants, $Q_L$ is a liquid absorption factor, and $Q_G$ is a gas absorption factor.

2. A hydrocarbon detection system that comprises:
a memory having hydrocarbon detection software; and
a processor coupled to the memory to execute the hydrocarbon detection software, wherein the hydrocarbon detection software configures the processor to retrieve seismic trace data from a storage device, and further configures the processor to process the seismic trace data to determine at least one wavelet absorption factor, wherein the wavelet energy absorption factor relates to seismic energy attenuation as a function of frequency,
wherein as part of configuring the processor to process the seismic trace data, the hydrocarbon detection software configures the processor to calculate a wavelet spectrum for each of multiple positions in a region of interest, and further configures the processor to fit a parameterized model to each wavelet spectrum,
wherein the parameterized model is expressible as:

$$\hat{A}(\omega) = \begin{cases} a_1 + a_2 e^{Q_L \ln^n(\omega)} & \text{for } 0 \leq \omega < \omega_D \\ a_3 e^{-Q_G \omega} & \text{for } \omega > \omega_D \end{cases}$$

where $\omega$ is frequency, n is a real number, $\omega_D$ is a dominant frequency, $a_1$, $a_2$, and $a_3$ are constants, $Q_L$ is a liquid absorption factor, and $Q_G$ is a gas absorption factor.

3. A method for detecting hydrocarbons, the method comprising:
receiving from a user an indication of a region of interest in a seismic data set; and
generating a display of wavelet energy absorption anomalies within the region of interest,
wherein the wavelet energy absorption anomalies are related to seismic energy attenuation as a function of frequency,
wherein said generating includes: calculating at least one wavelet energy absorption factor, which relates to seismic energy attenuation as a function of frequency, as a function of position within the region of interest,
wherein said calculating includes: determining wavelet energy absorption factor values that provide a least-square-error fit between a parameterized model and wavelet spectra extracted from the seismic data set,
wherein the parameterized model is expressible as:

$$\hat{A}(\omega) = \begin{cases} a_1 + a_2 \omega^{Q_L} & \text{for } 0 \leq \omega < \omega_D \\ a_3 e^{-Q_G \omega} & \text{for } \omega > \omega_D \end{cases}$$

wherein $\omega$ is frequency, $\omega_D$ is a frequency where the wavelet spectrum reaches a maximum, $a_1$, $a_2$, and $a_3$ are constants, $Q_L$ is a liquid absorption factor, and $Q_G$ is a gas absorption factor.

4. A method for detecting hydrocarbons, the method comprising:
receiving from a user an indication of a region of interest in a seismic data set; and
generating a display of wavelet energy absorption anomalies within the region of interest,
wherein the wavelet energy absorption anomalies are related to seismic energy attenuation as a function of frequency,
wherein said generating includes: calculating at least one wavelet energy absorption factor, which relates to seismic energy attenuation as a function of frequency, as a function of position within the region of interest,
wherein said calculating includes: determining wavelet energy absorption factor values that provide a least-square-error fit between a parameterized model and wavelet spectra extracted from the seismic data set,
wherein the parameterized model is expressible as:

$$\hat{A}(\omega) = \begin{cases} a_1 + a_2 e^{Q_L \ln^n(\omega)} & \text{for } 0 \leq \omega < \omega_D \\ a_3 e^{-Q_G \omega} & \text{for } \omega > \omega_D \end{cases}$$

wherein $\omega$ is frequency, n is a real number, $\omega_D$ is a dominant frequency, $a_1$, $a_2$, and $a_3$ are constants, $Q_L$ is a liquid absorption factor, and $Q_G$ is a gas absorption factor.

* * * * *